(12) United States Patent
Hansen et al.

(10) Patent No.: US 6,674,885 B2
(45) Date of Patent: Jan. 6, 2004

(54) SYSTEMS AND METHODS FOR ANALYZING TARGET CONTRAST FEATURES IN IMAGES OF BIOLOGICAL SAMPLES

(75) Inventors: Richard L. Hansen, Pennington, NJ (US); William J. Karsh, Plainsboro, NJ (US)

(73) Assignee: Amersham Biosciences Corp, Piscataway, NJ (US)

( * ) Notice: Subject to any disclaimer, the term of this patent is extended or adjusted under 35 U.S.C. 154(b) by 0 days.

(21) Appl. No.: 10/162,301

(22) Filed: Jun. 4, 2002

(65) Prior Publication Data

US 2003/0223626 A1 Dec. 4, 2003

(51) Int. Cl.$^7$ ................................. G06K 9/00
(52) U.S. Cl. ...................................... 382/133
(58) Field of Search ................ 382/128, 133; 250/461.2; 356/39; 436/43

(56) References Cited

U.S. PATENT DOCUMENTS

| | | | | |
|---|---|---|---|---|
| 4,175,860 | A | 11/1979 | Bacus | 435/39 |
| 6,025,128 | A | 2/2000 | Veltri et al. | 435/6 |
| 6,031,935 | A * | 2/2000 | Kimmel | 382/173 |
| 6,312,385 | B1 * | 11/2001 | Mo et al. | 600/443 |
| 2002/0090127 | A1 * | 7/2002 | Wetzel et al. | 382/133 |
| 2003/0073896 | A1 * | 4/2003 | Zuzan et al. | 600/407 |

OTHER PUBLICATIONS

M. Garcia–Bonafe, et al. "Differential diagnosis of malignant and reactive cells from serous effusions: image and texture analysis study" Analytical Cellular Pathology 12 (1996) pp. 85–98.

I. Young, et al. "Characterization of Chromatin Distribution in Cell Nuclei" Cytometry 7 (1986) pp. 467–474.

A. Doudkine, et al. "Nuclear texture measurements in image cytometry" Pathologica 87 (1995) pp. 286–299.

N. Pressman "Markovian Analysis of Cervical Cell Images" Journal of Histochemistry and Cytochemistry vol. 24, No. 1, 1976 pp. 138–144.

J. Bacus, et al. "Leukocyte Pattern Recognition" IEEE Transactions on Systems, Man, and Cybernetics vol. SMC–2, No. 4, Sep. 1972.

J. Gimenez–Mas, et al. "Automated Textural Analysis of Nuclear Chromatin: A Mathematical Morphology Approach" Analytical and Quantitative Cytology and Histology vol. 17, No. 1, Feb. 1995 pp. 39–47.

A. Smeulders, et al. "Texture Analysis of Cervical Cell Nuclei by Segmentation of Chromatin Patterns" Journal of Histochemistry and Cytochemistry vol. 27, No. 1, 1979 pp. 199–203.

G. Diaz, et al. "Nuclear pattern recognition by two–parameter texture analysis" Computer Methods and Programs in Biomedicine 49 (1996) pp. 1–9.

(List continued on next page.)

*Primary Examiner*—Andrew W. Johns
*Assistant Examiner*—Shervin Nakhjavan
(74) *Attorney, Agent, or Firm*—Royal N. Ronning, Jr.

(57) ABSTRACT

Systems and methods for acquiring images of biological samples and analyzing contrast features are provided. The present invention may determine whether a contrast feature in a image of a biological example qualifies as a grain (textural feature of interest). The size, intensity of contrast features, or other parameters may be tuned to find contrast features that correspond to features having significance in a given application. In addition, the total number of grains per image, the number of grains per sample, the number of grains per unit area, the area fraction occupied by grains, the ratio of intensity of grains to the intensity of the image, or other suitable characteristics may be determined.

30 Claims, 7 Drawing Sheets

OTHER PUBLICATIONS

D. Spina, et al. "Novel, contrast gradient–oriented, automated chromatin texture analysis" Virchows Archiv B Cell Pathology Including Molecular Pathology 62 (1992) pp. 119–124.

C. Rousselle, et al. "Chromatin texture analysis in living cells" The Histochemical Journal 31 (1999) pp. 63–70.

K. Friedrich, et al. "Nuclear Image Analysis of p53–Positive and –Negative Cells in Breast Carcinoma" Analytical and Quantitative Cytology and Histology vol. 19, No. 4, Aug. 1997 pp. 285–293.

A. Dawson, et al. "Chromatin Texture Measurement by Markovian Analysis: Use of Nuclear Models to Define and Select Texture Features" Analytical and Quantitative Cytology and Histology vol. 15, No. 4, Aug. 1993 pp. 227–235.

* cited by examiner

SYSTEMS AND METHODS FOR ANALYZING TARGET CONTRAST FEATURES IN IMAGES OF BIOLOGICAL SAMPLES

BACKGROUND OF THE INVENTION

The present invention relates to systems and methods for analyzing textural features in biological samples. More specifically, the present invention relates to systems and methods for analyzing target contrast features in digital images of biological samples.

Analysis of textural features in biological specimens is desirable in a wide range of applications. It is often useful to have a quantitative measurement of the occurrence of a defined structural element in a biological sample, as well as a quantitative comparison between two samples of the occurrence of a feature.

There is a current need in drug discovery and development, as well as general biological research, to quickly and accurately image and analyze textural features in a large numbers of biological samples. This need has largely arisen in the pharmaceutical industry where it is common to test chemical compounds for activity against a variety of biochemical targets (e.g., receptors, enzymes, and nucleic acids).

Many current techniques for determining structure and texture in biological specimens require significant manual intervention or complex, time-intensive computation.

Accordingly, given the need for imaging large numbers of samples which frequently results in a large amount of data, it would be desirable to provide rapid methods for analyzing images of samples shortly after their acquisition. It would also be desirable to complete analysis of images quickly enough so as to not slow down data acquisition.

It would further be desirable to provide systems and methods for rapid analysis of target contrast features in images of biological samples.

SUMMARY OF THE INVENTION

The present invention relates to systems and methods for rapidly identifying contrast features of specific size and contrast in digital images of biological samples that may have varying backgrounds. The present invention may efficiently search an image for object seed points in a target contrast feature, make decisions in the analysis procedure as to whether to further consider a. local region or to move to the next region, and if a region is evaluated, to use selected portions in calculating parameters to qualify the contrast feature as a grain.

The present invention may analyze two dimensional, three dimensional, or other suitable multi-dimensional images. Images may be acquired, for example, by using fluorescence imaging, fluorescence polarization imaging, dark field imaging, bright field transmission imaging, phase contrast imaging, differential interference contrast imaging, or any other suitable imaging technique or image acquisition system after which analysis by the present invention may ensue.

Contrast features analyzed by the present invention may be comprised of small clusters of pixels that are either higher or lower in intensity than the pixels that surround them. In some embodiments, parameters may be tuned to locate contrast features whose characteristic size or intensity level correspond to features having significance in a given application. Contrast features that meet size or intensity requirements may be classified as grains (textural features).

For example, contrast features may be analyzed using the systems and methods of the present invention to determine cell surface receptor internalization, nuclear chromatin condensation, localization to intracellular compartments that produce a punctate staining pattern (e.g., mitochondria or golgi), localization to any vesicle, pit, lysosome or endosome either within a cell or on the cell surface, any endocytosis, exocytosis or degranulation event whereby matter is internalized or released from a cell via vesicular structures, or any other suitable determination from an image of a biological sample.

In some embodiments, the present invention may calculate the number of grains found in a region of interest, the number of grains found in an image, the number of grains found in a biological sample, the number of grains per unit area, the ratio of grain intensity to image intensity, the average grain intensity, the area fraction occupied by grains, any combination thereof, or any other suitable computation.

BRIEF DESCRIPTION OF THE DRAWINGS

Further features of the invention, its nature and various advantages will be more apparent from the following detailed description of the preferred embodiments, taken in conjunction with the accompanying drawings, in which like reference characters refer to like parts throughout, and in which.

DETAILED DESCRIPTION OF THE INVENTION

The present invention is now described in more detail in conjunction with FIGS. 1–9.

Figure 1:
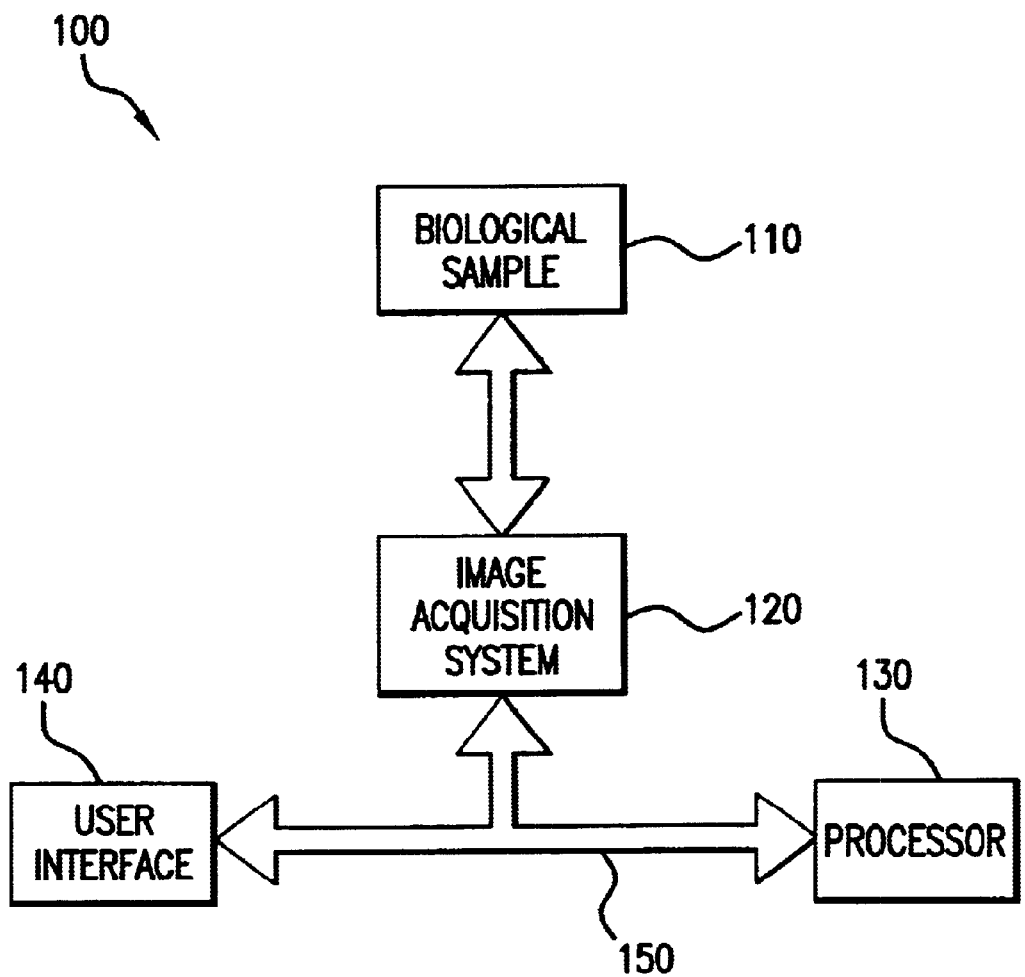
FIG. 1 illustrates a system for imaging a biological sample and analyzing contrast features of the image in accordance with various embodiments of the present invention.

FIG. 1 illustrates system 100, which may be used for imaging biological samples and analyzing contrast features in the images. As shown, system 100 may include biological sample 110, image acquisition system 120, processor 130, user interface 140, and communication links 150.

Sample 110 may be cells, tissue, or any other suitable biological sample that may be imaged by image acquisition system 120 to determine contrast features or grains. For example, biological sample 110 may be located in a microtitre well plate or other suitable device. In some embodiments, biological sample 110 may contain fluorescent markers, nuclear markers (e.g., Hoechst 33342, propidium iodide, etc.), or any other suitable markers that may facilitate the acquisition of an image of biological sample 110 by image acquisition system 120. Additionally, markers may be used to identify portions (e.g., cell nuclei, etc.) of biological sample 110 which may be of interest when sample 110 is imaged by image acquisition system 120.

Digital images may be acquired from samples (e.g., cellular samples) using image acquisition system 120. Preferably, images may be acquired with a multi-channel (e.g., red, green, blue, etc.) fluorescence imaging system. Alternatively, digital images of the sample may be acquired by bright field transmission imaging, dark field imaging, phase contrast imaging, differential interference contrast imaging, magnetic resonance imaging, fluorescence polarization imaging, or by any other suitable imaging technique. The digital images acquired with image acquisition system 120 may be two-dimensional, three-dimensional, or any other suitable multi-dimensional images of biological sample 110.

In system 100, processor 130 may be an integrated circuit, microprocessor, personal computer, laptop computer, handheld computer, personal digital assistant (PDA), computer terminal, server, minicomputer, mainframe computer, a combination of such devices, or any other suitable device. Processor 130 may be used to identify contrast features in at least one image of biological sample 110 acquired by image acquisition system 120.

In some embodiments, processor 130 may utilize thresholding and filtering techniques to identify regions of interest (e.g., cell nuclei, etc.) in an image of biological sample 110. Dilation, erosion, or other suitable data operations may be performed by processor 130 to define a region of interest of the imaged sample. In some embodiments, processor 130 may determine grains in an image, as well as determine the characteristics of the grains (e.g., total number of grains in an image, total number of grains in a sample, number of grains per unit of area, sum of intensity of grains to total intensity of an image, etc.).

Processor 130 may have a communications interface to send or receive data from image acquisition system 120 or user interface 140 over communication links 150.

User interface 140 may be hardware, software, a combination thereof, or any other suitable device. For example, user interface 140 may be a mouse, keyboard, computer, touch screen, or any other suitable device. User interface 140 may allow a user to control image acquisition system 120. In some embodiments, user interface 140 may allow a user to locate regions of interest in a image, manipulate the size of an area of interest, or any other suitable function.

Communication links 150 may be wire links, wireless links, coaxial cable links, telephone line links, satellite links, lightwave links, microwave links, optical links, a combination thereof, or any other suitable links for communicating data between image acquisition system 120, processor 130, or user interface 140.

Figure 2:
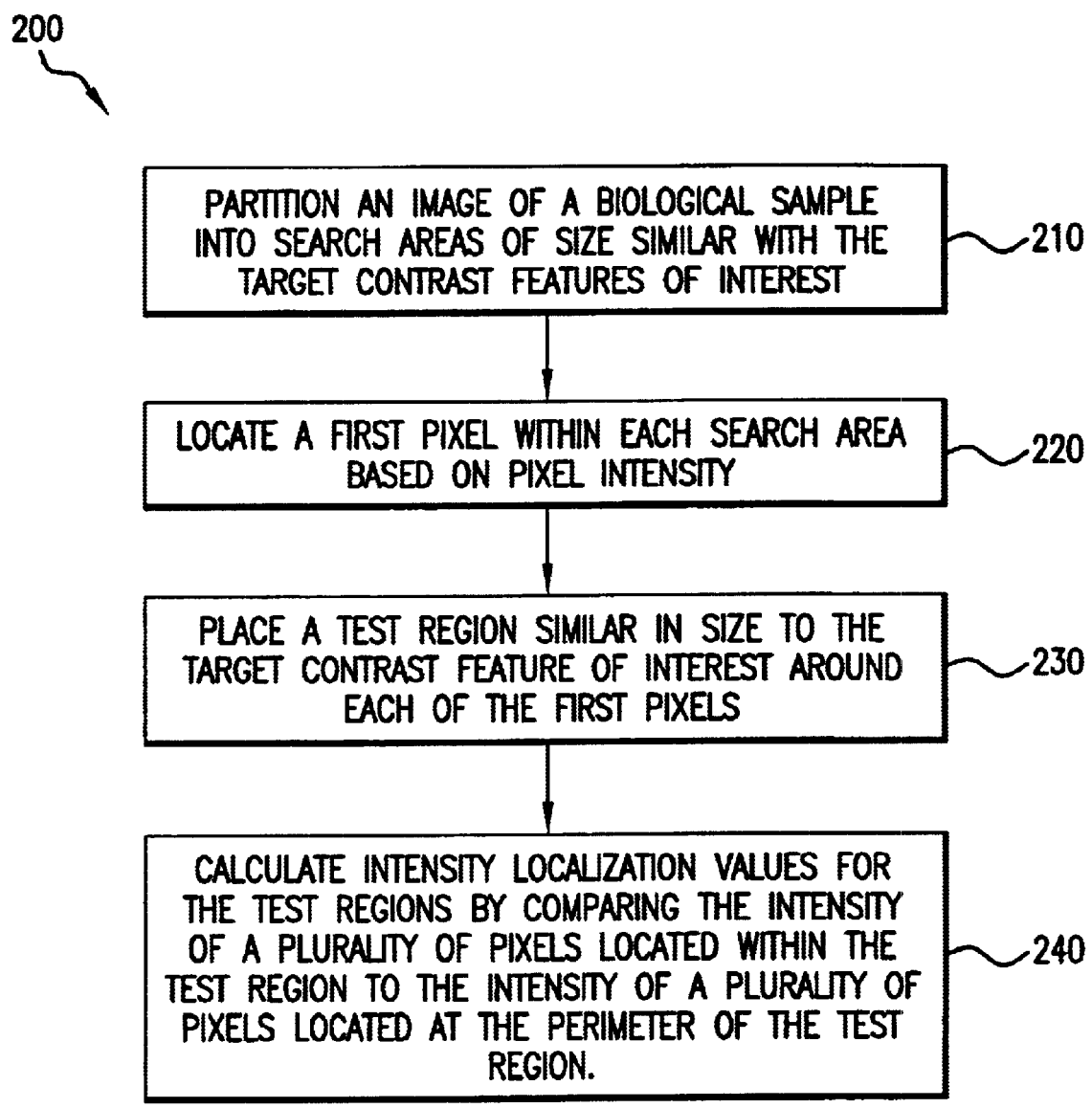
FIG. 2 illustrates a flow diagram for analyzing contrast features of images of biological samples in accordance with various embodiments of the present invention.

FIG. 2 illustrates a flow diagram for method 200 for analyzing target contrast features of digital images of biological samples. Method 200 is discussed below and is followed by a description of method 300 (illustrated in FIGS. 3–4). Method 300 incorporates additional features and may, for example, be used to analyze a digital image containing multiple cells, where each cell is to be identified and analyzed for grain content. The example in method 300 represents a typical application and is the preferred embodiment of the present invention.

Turning to FIG. 2, after acquisition of an image of a biological sample with an apparatus as illustrated in FIG. 1, method 200 may commence to analyze contrast features contained in the image. Method 200 may be implemented on system 100 of FIG. 1, on a stand-alone computer or network of computers, or on any other suitable equipment. Method 200 may be run automatically with or without user input.

Method 200 may be used to analyze target contrast features in biological specimens, such as receptor internalization, nuclear chromatin, vesicular structures, cellular organelles, tissue regions, subcellular regions, any combination thereof, or any other suitable features.

At step 210 (FIG. 2), the image may be partitioned into search areas. The search areas may be, for example, an array of grid boxes. The search areas are preferably, but need not be, similar in size to the target contrast features. As defined herein, regions or areas or features are said to be "similar" in size to each other when they have. linear dimensions that are equal to each other within ±0%, ±5%, ±10%, ±20%, ±50%, ±90%, or within a factor of two in size; any suitable amount in the range of −90% to +100% may be used. Regions, areas, or features may have linear dimensions that are above or below these ranges, and method 200 may still be performed.

At step 220, all pixels in each search area are in turn examined to identify a first pixel in each search area based on a brightness criterion (e.g., intensity level). The first pixels may be the brightest pixel or alternatively, the first pixel may be the dimmest pixel in each search area. In some embodiments, a user may set or adjust the brightness criterion (e.g., intensity level) for the first pixel by manipulating a user interface (e.g., user interface 140 of FIG. 1). Alternatively, apparatus such as system 100 of FIG. 1 may automatically set or adjust the brightness criterion.

At step 230, a test region, again similar in size to the target contrast feature, is centered around each of the first pixels. A test region may, for example, be a box, circle, or other suitably shaped region. In some embodiments of the invention, it may be sufficient that the first pixel is located within the test region, rather than being centered in the test region.

The shape of the test region may be chosen based on a balance of the criteria to best conform to the target contrast features and to expedite processing times. For example, the test region is often a box, which facilitates faster processing times by allowing contiguous elements in computer memory space to be sequentially accessed. This box shape has been found suitable for analyzing endosomes or other vesicles within a cell.

The test regions are used in calculating an intensity localization value (V) at step 240. This may be accomplished by comparing an intensity (value) of a plurality of pixels located within the test region, defined as interior pixels with intensity $I_c$, to an intensity (value) of a plurality of pixels located at the perimeter of the test region, defined as perimeter pixels with intensity $I_b$, or by using any other suitable technique. The intensity of a plurality of pixels as defined herein represents the average intensity of the pixels, the summed intensity of the pixels, the median intensity of the pixels, or any other suitable method for calculating the collective pixel intensity. Not every pixel in the test region is required to calculate the intensity localization value.

The interior pixels examined and used to calculate the intensity level within the test region may be in any suitable pixel pattern (e.g., cross, box, circle, etc.) and need not be contiguous. The interior pixels may contain any fraction of the pixels in the test region ranging from a single pixel, 10% of the pixels, 25% of the pixels, 50% of the pixels, 75% of the pixels, or up to 100% of the pixels in the test region.

The perimeter pixels examined and used to calculate the perimeter pixel intensity may include a plurality of pixels located at the perimeter of the test region. The perimeter pixels may touch the perimeter of the test region and be located inside, outside, or both inside and outside the perimeter of the test region. The perimeter pixels may be in a pattern that is a single pixel wide or have a nominal width that is 10%, 25%, 50%, 75%, or up to 100% of the linear dimension of the test region. The perimeter pixels may start adjacent to the edge of the test region protruding outward or inward or may overlap the test region perimeter. The perimeter pixels may include or touch the test box perimeter, or may be offset from the test box perimeter ±0%, ±10%, ±25%, ±50%, ±75%, ±100% or any suitable fraction of the linear dimension of the test region in the range of 0 to 100%. In some embodiments, the perimeter pixels may overlap the interior pixels. The perimeter pixels examined and used to calculate the perimeter pixel intensity may be in any suitable pattern (e.g., four corners, four sides, box) and need not be contiguous. Not every pixel adjacent to the test region perimeter is required in calculating the average intensity of the perimeter pixels.

The intensity localization value may be calculated in any suitable manner that represents the comparison of the intensity of the interior pixels to the intensity of the perimeter pixels but that differ with regard to normalization for specific background intensity levels.

In low background intensity conditions, the intensity localization value may be computed by dividing the intensity of the interior pixels by the intensity of the perimeter pixels ($V=I_c/I_b$). In high background intensity conditions, the intensity localization value may be computed by taking the difference between the intensity of the interior pixels and the intensity of the perimeter pixels, and dividing the result by the intensity of the perimeter pixels ($V=(I_c-I_b)/I_b$). V may in some embodiments equal the difference between $I_c$ and $I_b$.

Moreover, the test region need not be perfectly centered around the first pixel. If desired, the test region may be centrally located around the first pixel so that the center of the test region is at a distance [X] from the first pixel. While the test region may be centrally located around the first pixel, method 200 may still be performed if the test region is not centrally located around the first pixel. Method 200 may be performed while the first pixel is located within the test region. If the largest distance from the center of the test region to the perimeter of the test region is R, the test region may be considered to be centrally located around the first pixel so long as the first pixel is within the test region and X has a value of 0 (i.e., the center of the test region is perfectly aligned with the first pixel), a value of 5% of R, a value of 10% of R, a value of 20% of R, a value of 50% of R, a value of 100% of R, or any suitable value within in the range of 0 to 100% of R.

When an image of a biological sample has been analyzed with method 200, several calculated parameters may be examined. An image averaged or median value of the intensity localization value, a distribution of intensity localization values within the image, a maximum spread and standard deviation of intensity localization values, or any other suitable calculated parameter based on the intensity localization values may report the biological activity of the imaged specimen.

The typical application of this algorithm to a biological image may require identification of unique regions of interest for processing based on separate sample characteristics. In addition, ensuring that only well separated features are considered, and qualification of identified contrast features by the calculated intensity localization value may increase the speed of the algorithm and improve the accuracy of the data.

Figure 3:
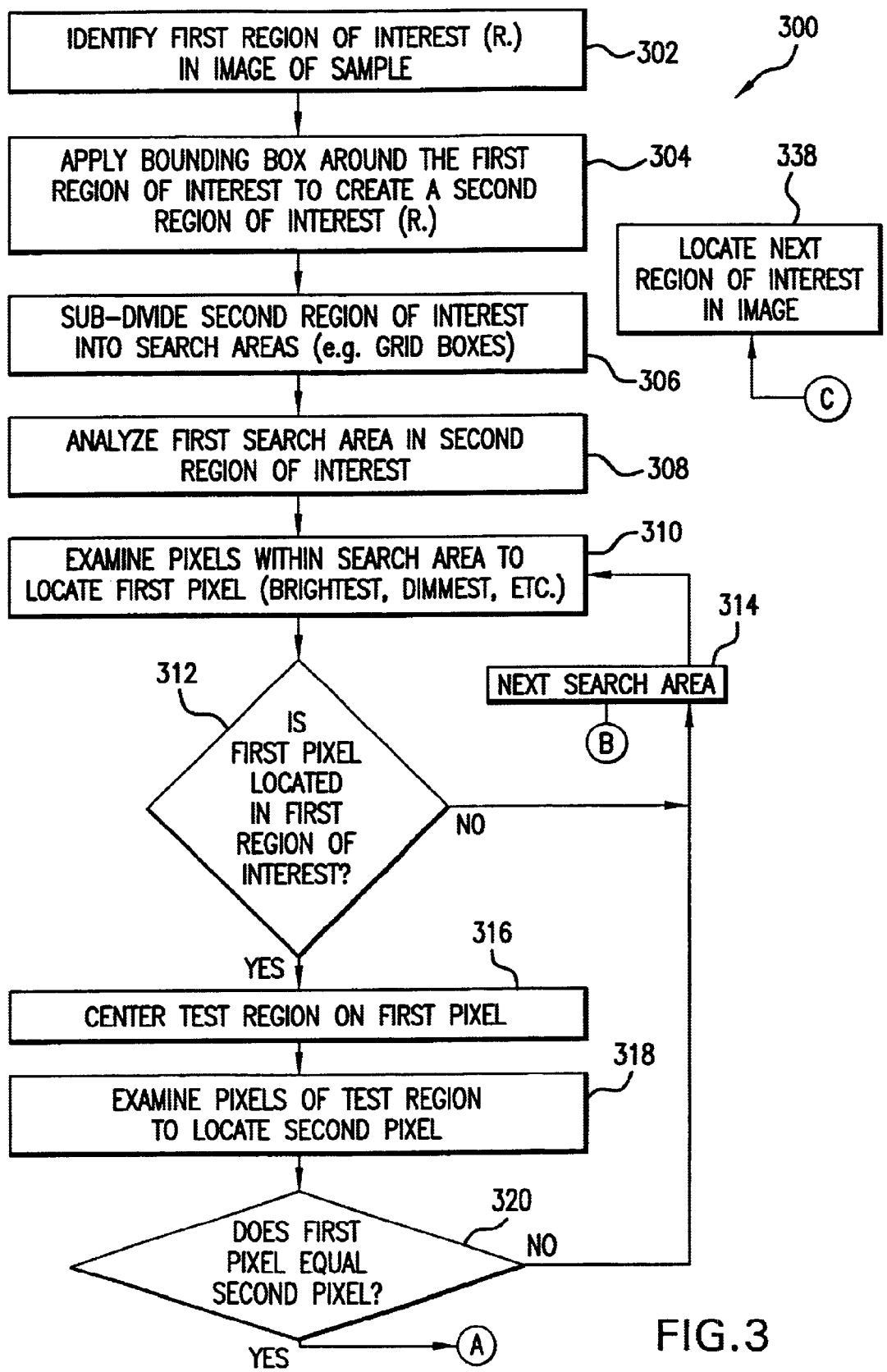
FIGS. 3–4 illustrate a more detailed flow diagram of a method for analyzing contrast features of images of biological samples in accordance with various embodiments of the present invention.
Figure 4:
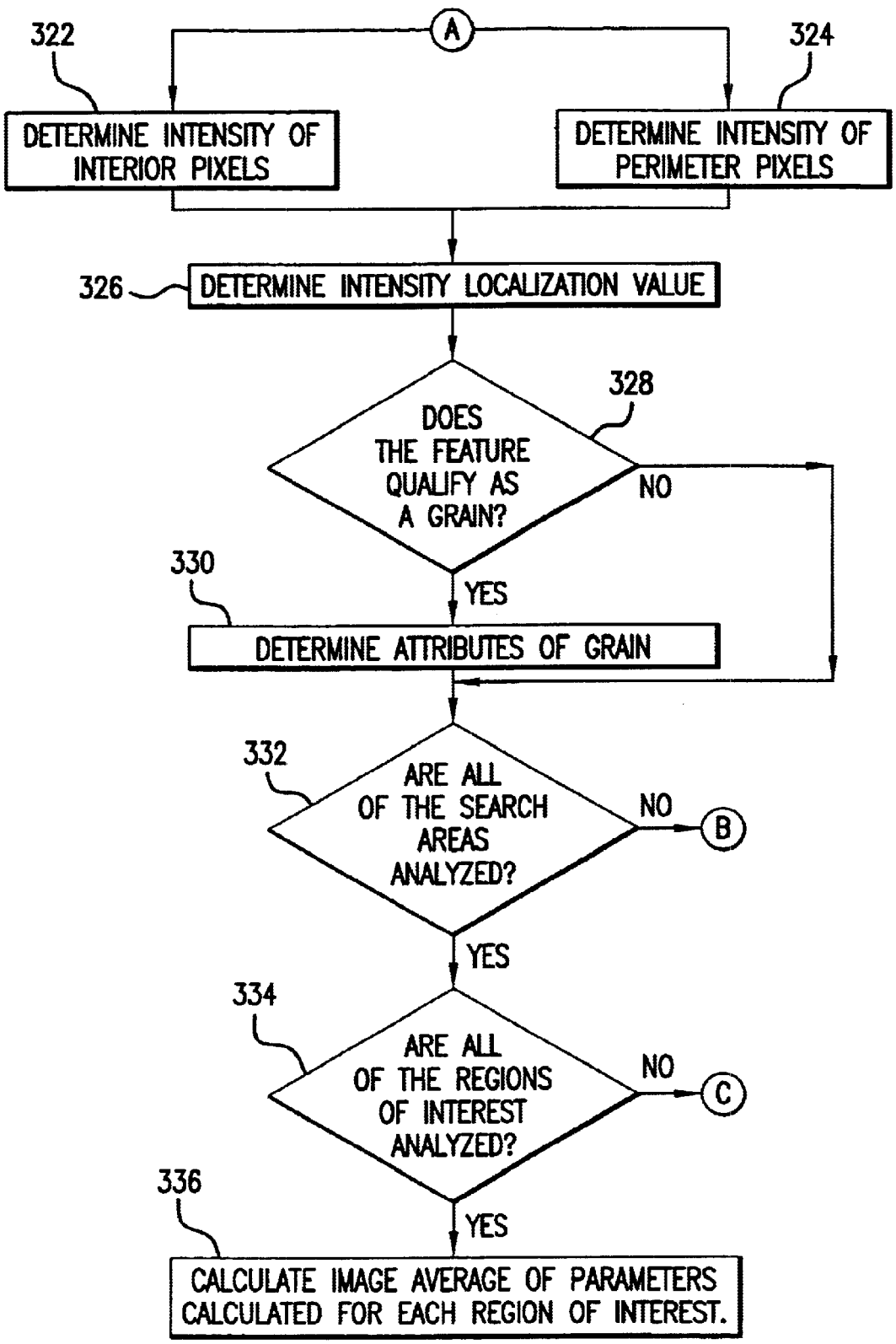

FIGS. 3–4 illustrate method 300, which incorporates these additional features and is the preferred embodiment of the invention.

As shown in step 302 of FIG. 3, a first region of interest (e.g., first region of interest $R_1$ as illustrated in FIGS. 5–8) in an image of a sample may be identified. For example, nuclear markers in a cellular sample (e.g., biological sample 110 illustrated in FIG. 1) may be used to identify the nucleus as a first region of interest.

In some embodiments, a user may manipulate a user interface (e.g., user interface 140 illustrated in FIG. 1) to select a first region of interest in an image. In other embodiments, a user may manipulate a user interface to select parameters which may characterize a region of interest. For example, if individual cells are to be identified by their nuclei, the user may set parameters for nuclear threshold, nuclear size and a dilation factor to define a region (e.g., region R1 as illustrated in FIGS. 5–8) of each cell to analyze for grain content. In some embodiments, creating a first region of interest may not be necessary in which case method 300 would consider the entire image as the first region of interest.

Figure 5:
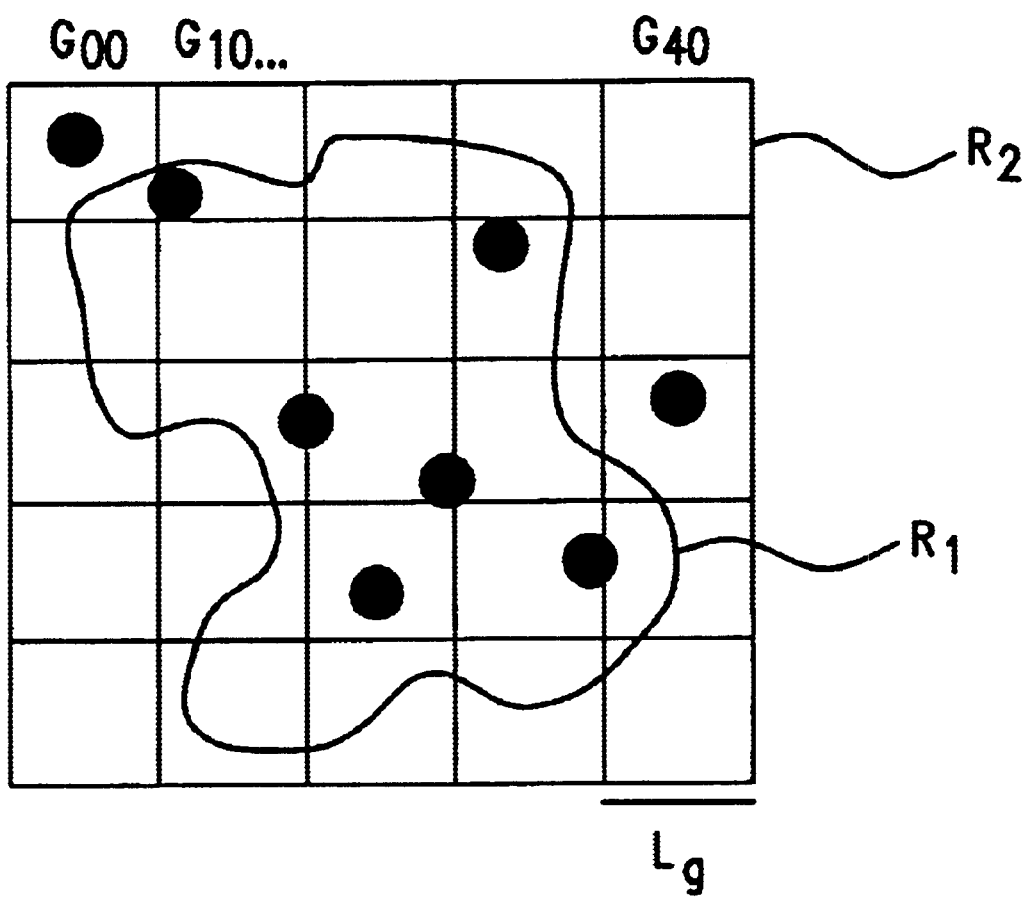
FIG. 5 illustrates an image of a biological sample with contrast features, where regions of interest within the image have been identified and subdivided to form an array of grid boxes in accordance with various embodiments of the present invention.

Continuing with the present example, at step 304, a Cartesian bounding-box or any other suitable device may be placed around the first region of interest (e.g., dilated nucleus) determined at step 302 to create a second region of interest (e.g., region of interest $R_2$ as illustrated in FIG. 5). Creating the second region of interest from the first region of interest is an optional step and need not be performed if the first region of interest adequately defines a suitable portion of the sample for analysis.

At step 306, the second region of interest may be subdivided into search areas; the search areas in the present example consist of an array of grid boxes ($G_{ij}$), each with linear dimension $L_g$. In some embodiments, the linear dimension is preferably, but need not be, similar in size to the target contrast features. Each search area (grid box) may contain a plurality of pixels. The value of linear dimension may be set or adjusted by the user by manipulating a user interface (e.g., user interface 140 of FIG. 1), or set or adjusted by the apparatus of FIG. 1, or a combination thereof.

As illustrated in FIG. 5, a second region of interest, as illustrated in the form of a bounding box $R_2$, may surround a first region of interest $R_1$. As shown, the second region of interest $R_2$ may be subdivided into search areas (grid boxes $G_{00}$, $G_{10}$, etc.) with linear dimension $L_g$.

Turning again to FIG. 3, analysis of the portion of the image in a first search area (e.g., grid box $G_{00}$ illustrated in FIG. 5) may begin at step 308. Steps 310–332, which relate to the analysis of the image, may be repeated for each of the search areas. As shown at step 310, a plurality of pixels within the search area may be examined to identify the first pixel. In some embodiments, the first pixel may be the brightest pixel, or alternatively, the dimmest pixel. For example, factors such as the type of imaging acquisition system used, the biological sample, the markers located within the biological sample, a combination thereof, or any other suitable factors may determine whether the search should be for the brightest or the dimmest pixel. Similar to step 220 described above and illustrated in FIG. 2, a user may set or adjust a brightness criterion (e.g., intensity level) for the first pixel at step 310 by manipulating a user interface (e.g., user interface 140 of FIG. 1). In some embodiments, a system such as the apparatus shown in FIG. 1 may be used to determine or adjust a brightness criterion for the first pixel.

In some embodiments, it may be preferable in method 300 that the first pixel intersect the region of interest $R_1$. Test 312 may determine whether the first pixel (e.g., $P_1$ illustrated in FIG. 6) is located within the first region of interest (e.g., $R_1$ illustrated in FIG. 6). If it is preferred that the first pixel intersect the first region of interest but found not to do so, the present search area may be discarded and the next search area determined at step 314, after which step 310 may be repeated. If there is no preference that the first pixel intersect the first region of interest, then step 312 may be skipped.

Figure 6:
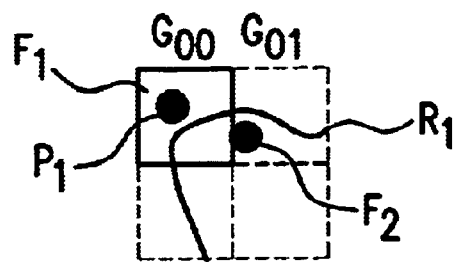
FIG. 6 illustrates examining a grid box to locate a pixel to determine if it is within the region of interest in accordance with various embodiments of the present invention.

For example, as shown in FIG. 6, grid box $G_{00}$ may be searched for the brightest pixel ($P_1$). $P_1$ is represented as being located within the contrast feature $F_1$. In some embodiments, if it is preferred that $P_1$ intersect region of interest $R_1$ (i.e., $P_1$ is within region $R_1$), $P_1$ would be skipped by the locating process, and the next grid box (e.g., $G_{01}$) would be examined.

When a valid first pixel (e.g., brightest pixel, dimmest pixel, etc.) is determined, a test region (e.g., test region T, illustrated as a box in FIG. 7) or other suitable device may be preferably centered on the first pixel as described in step 316 of FIG. 3. The characteristics of the test region of step 316 may be similar to the test region of step 230 described above. Again, the test region need not be centered on the first pixel for method 300 to work. The test region may have a linear dimension ($L_t$) similar in size to the contrast features of interest.

The test region may contain the first pixel and a plurality of interior pixels which may be located within the test region. In addition, the test region may have a plurality of perimeter pixels located at the perimeter of the test region as described above in connection with method 200.

At step 318, a plurality of pixels of the test region may be examined to determine a second pixel. For example, the second pixel may be determined by locating the brightest or the dimmest pixel in a similar manner as to how the first pixel was located at step 310.

Test 320 may be used to determine if the first and second pixels are the same pixel. If they are not the same pixel, the analysis of the current search area may be discarded and method 300 may continue by locating the next search area at step 314. If the first and second pixels are the same pixel, method 300 may continue by performing an intensity localization measurement on the test region, as illustrated in steps 322–330 of FIG. 4.

Figure 7:
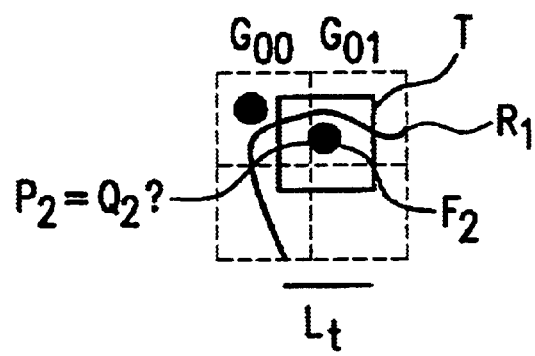
FIG. 7 illustrates centering a test box around a first located pixel to search for a second pixel in accordance with various embodiments of the present invention.

For example, FIG. 7 illustrates a pixel, $P_2$, located within grid box $G_{01}$ of the test region and within contrast feature $F_2$, that intersects region of interest $R_1$. A test region (T), with linear dimension $L_t$, may be centered around $P_2$. Test region T may be searched for the brightest (or dimmest) pixel, $Q_2$. If the pixels are the same (i.e., $P_2=Q_2$), the analysis (method 300 illustrated in FIGS. 3–4) may continue. Otherwise, the next grid box (search area) in the second region of interest, $R_2$, may be examined.

As illustrated in FIG. 4, step 322 may determine the intensity of a sample of the interior pixels of the test region; this intensity is denoted $I_c$ and is described above with method 200. The interior pixels sampled may be adjacent to the first pixel. The pixels included in the sample may be selected to be within a predetermined distance of the first pixel. In the present example, the interior pixels included in calculating $I_c$ may be within a sampling box (e.g., sampling box C illustrated in FIG. 8) preferably centered on the second pixel with linear dimension $L_c$. The sampling box need not be centered on the second pixel in order for the sampling to be effective. The sampling box dimension $L_c$ may be less than the linear dimension of the test region. In some embodiments, sampling box side $L_c$ may be one half the dimension of the test region. Thus, the sampled region may include at least one of the interior pixels, but may exclude the perimeter pixels (e.g., the perimeter pixels that may be located at or adjacent to boundary B illustrated in FIG. 8) of the test region. In some embodiments, averaging the interior pixels located adjacent to the first pixel may ensure that the measurement is not skewed by anomalously valued single pixels. In some embodiments, the pixels included in calculating $I_c$ may preferably intersect $R_1$.

Figure 8:
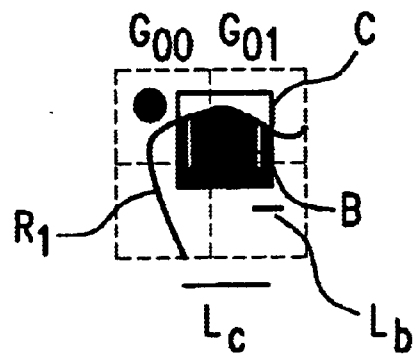
FIG. 8 illustrates determining the average intensity of the pixels in a test region and the average intensity of perimeter pixels located on the perimeter of the test region in accordance with various embodiments of the present invention.

For example, FIG. 8 illustrates a sample area of pixels in region C surrounding the first pixel where $I_c$ may be determined by step 322 (FIG. 3).

The intensity of the perimeter pixels may be measured at step 324 of FIG. 4; this intensity is denoted $I_b$ and is described above with method 200. The pixels included in calculating $I_b$ may be pixels located within a predetermined distance $L_b$ of the test region (e.g., perimeter pixel pattern B illustrated in FIG. 8). In some embodiments, the pixels used to calculate $I_b$ may be required to intersect $R_1$.

FIG. 8 also illustrates the perimeter pixel pattern B, whose pixels may be sampled to determine the intensity $I_b$. The portion of the pixels located within region $R_1$, as shown in FIG. 8, may be used for the samples for $I_c$ and $I_b$. In some embodiments, step 324 of FIG. 4 may be performed simultaneously with step 322.

Turning again to FIG. 4, an intensity localization value, V, may be calculated at step 326. In some embodiments, the intensity localization value may be computed in any suitable manner that represents the comparison of the intensity of the interior pixels, $I_c$, to the intensity of the perimeter pixels, $I_b$, but that differ with regard to normalization for specific background intensity levels as described above in connection with method 200.

Test 328 may determine if the test region contains a feature that qualifies as a grain by determining if the computed intensity localization value is greater than or less than a predetermined threshold value; that is, if the absolute value of the intensity localization value is greater than a predetermined threshold value. In some embodiments, a user may set or adjust the threshold value by manipulating a user interface (e.g., user interface 140 of system 100 of FIG. 1) or the value may be set or adjusted by the apparatus (e.g., system 100 of FIG. 1). Factors such as the background intensity level of the image, the imaging system or technique used, the type of sample imaged, or the criteria for an object of interest to be identified may determine what threshold level is desirable.

If the feature qualifies as a grain, it may be included in the calculations for a series of properties (e.g., number of grains per region of interest, number of grains per image, number of grains per area, etc.) for the region of interest at step 330. In some embodiments, test 328 may be forgone such that each of the identified second pixels qualify as grain features for which suitable attributes may be calculated.

Test 332 may determine whether all of the search areas of the region of interest have been analyzed. If all of the search areas have not been analyzed, step 314 (illustrated in FIG. 3) may retrieve the next search area of the region of interest.

If all of the search areas for a region of interest have been analyzed, a series of parameters may be calculated from the number, intensity, or distribution of grain features. For example, the number of grains per image, the number of grains per region of interest, the number of grains per biological sample, or the average intensity localization value may be calculated. In addition, the total or fractional area in a region of interest or the entire image occupied by qualified grains may be calculated.

An area of a grain in a test region may be defined by the area of the interior pixels, the total area of the test region, the area of the perimeter pixels, or the sum of the interior and perimeter pixels. If the area of grains are being calculated in a second region of interest, the pixels (e.g., interior pixels, perimeter pixels, test region, etc.) used to calculate the area may be required to intersect the first region of interest.

An intensity of the qualified grains may also be considered. For example, the total or average intensity of all grains may be calculated for the entire image or for a region of interest. The intensity of a grain may be defined as the summed or averaged pixel intensities of the interior pixels of the test region, the entire test region, the perimeter pixels of the test region, or the combined interior and perimeter pixels of the test region. In addition, the ratio of all grain intensities of the entire image to the intensity of the entire image may be calculated. In some embodiments, the ratio of all grain intensities in a region of interest to the intensity of the entire region of interest may be calculated. If the intensity of grains are being calculated in a separately defined region of interest, the pixels (e.g. interior pixels, perimeter pixels, test region) used to calculate the intensity may be required to intersect the region of interest.

Test 334 may determine whether all regions of interest have be selected and analyzed. If all regions of interest in an image have been analyzed, step 336 may calculate an image average of parameters (e.g., number of grains, area fraction, ratio of total intensity of grains to intensity of image, etc.) that may be calculated for each region of interest, along with associated standard deviations. The values for all grains in each analyzed region of interest may be pooled or averaged, either directly or with a suitable weighting factor, to create values for the entire image.

In some embodiments, step 336 may also calculate information for the digital image, including the total number of grains in the digital image, the area of at least one grain in the digital image, the total number of grains per unit area in the digital image, the intensity of grains in the digital image, the ratio of the intensity of grains in the image to the total intensity of the digital image, any combination thereof, or any other suitable calculation.

If other regions of interest exist in an image, step 338 (illustrated in FIG. 3) may locate the next region of interest. Upon locating the next region, method 300 may begin again starting at step 304.

In some embodiments, grain analysis may be performed on a three-dimensional image or other suitable multi-dimensional image. Steps may be added to the above-described method 300 (illustrated in FIGS. 3–4). For example, a three-dimensional image may be divided into suitable sections in which the steps of method 300 may be performed on an individual section. Analysis of each section may be performed until there are no more sections of the three-dimensional image.

Figure 9A:
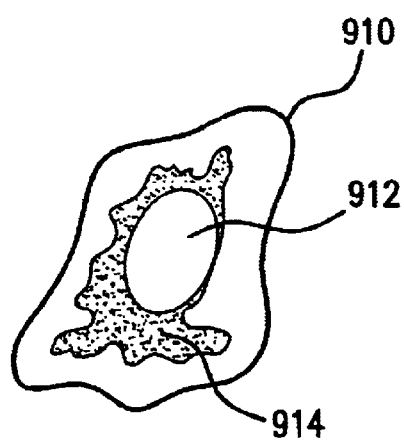
FIG. 9A illustrates a fluorescence image of a cell in accordance with various embodiments of the present invention.

Method 300, as described above, may be used to analyze biological samples (e.g., cells located in wells of a microtiter plate). Many cells may exist within an individual well, and each cell may be imaged and analyzed. It may be desirable to locate grains within the nucleus of a cell. For example, a cell may be marked with a fluorescent marker that causes the nucleus to fluoresce red during imaging. FIG. 9A illustrates red and green channels of a fluorescence image of a cell sample 910. Nucleus 912 of the cell may fluoresce red, while GFP-labeled protein may fluoresce green to show punctate pattern 914.

Figure 9B:
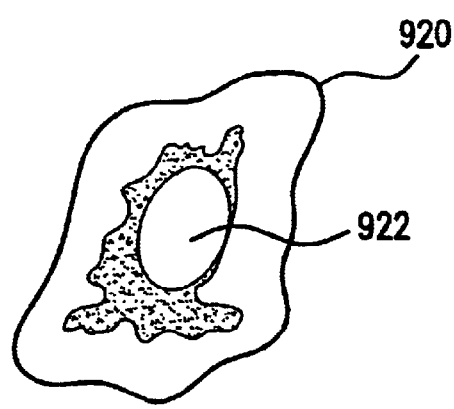
FIG. 9B illustrates the identification of a cell nucleus in accordance with various embodiments of the present invention.
Figure 9C:
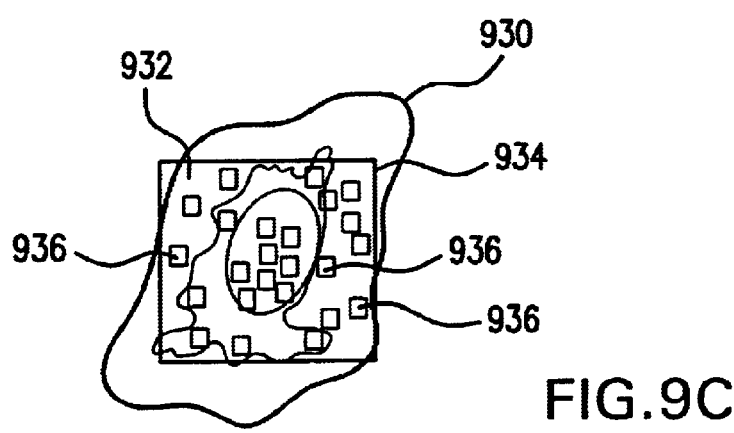
FIG. 9C illustrates a box around the nucleus of a cell and smaller boxes containing contrast features qualifying as grains in accordance with various embodiments of the present invention.
Figure 9D:
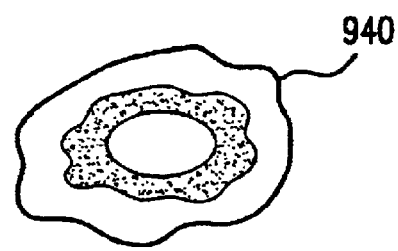
FIG. 9D illustrates a control cell in accordance with various embodiments of the present invention.

FIG. 9B illustrates the identification of nucleus 922 in cell sample 920. Identification of nucleus 922 may be a seed point to identify grains. FIG. 9C shows cell sample 930 which may contain analyzed region 932. As shown, box 934 may represent the region of interest in the image, and smaller boxes 936 may identify the features qualifying as grains. For illustrative purposes, FIG. 9D shows an image of cell 940 without staining or markers.

The present invention should be applicable to characterizing granularity in a variety of biological samples including but not limited to: cell surface receptor internalization, nuclear chromatin condensation, localization to intracellular compartments that produce a punctate staining pattern (e.g. mitochondria or golgi), localization to any vesicle, pit, lysosome or endosome either within a cell or on the cell surface, or any endocytosis, exocytosis or degranulation event whereby matter is internalized or released from a cell via vesicular structures. Further, the granularity related to the clustering of a unique tissue type or marker in a larger imaged tissue sample may also be calculated. For example, distributions of plaques, tumors, or chemical moieties that can be histochemically or otherwise marked and imaged may be characterized by granularity analysis.

It will be understood that the foregoing is only illustrative of the principles of the invention, and that various modifications can be made by those skilled in the art without departing from the scope and spirit of the invention.

What is claimed is:

1. An automated method for analyzing target contrast features in a digital image of a biological sample, comprising:

partitioning at least a portion of the digital image into search areas of similar size with the target contrast features;

locating a first pixel within each of the search areas based on pixel intensity level;

locating a test region around each of the first pixels, wherein the test regions and the target contrast features are similar in size; and calculating intensity localization values for the test regions by comparing, for each test region, the intensity of a plurality of interior pixels located within the test region to the intensity of a plurality of perimeter pixels located at the perimeter of the test region.

2. The method of claim 1, further comprising:

locating a second pixel within each of the test regions based on pixel intensity level;

determining if the first and the second pixels are the same pixel; and if the first and the second pixels are the same pixel, calculating the intensity localization value.

3. The method of claim 1, further comprising qualifying the contrast feature as a grain if the absolute value of the calculated intensity localization value is greater than a predetermined threshold intensity level.

4. The method in claim 1, further comprising:
qualifying the contrast feature as a grain if the absolute value of the calculated intensity localization value is greater than a predetermined threshold intensity level; and
determining the average intensity localization value in the digital image.

5. The method in claim 1, further comprising:
qualifying the contrast feature as a grain if the absolute value of the calculated intensity localization value is greater than a predetermined threshold intensity level; and
determining the total number of grains in the digital image.

6. The method in claim 1, further comprising:
qualifying the contrast feature as a grain if the absolute value of the calculated intensity localization value is greater than a predetermined threshold intensity level; and
determining the area of at least one grain in the digital image.

7. The method in claim 1, further comprising:
qualifying the contrast feature as a grain if the absolute value of the calculated intensity localization value is greater than a predetermined threshold intensity level; and
determining the total number of grains per unit area in the digital image.

8. The method of claim 1, further comprising:
qualifying the contrast feature as a grain if the absolute value of the calculated intensity localization value is greater than a predetermined threshold intensity level; and
determining the intensity of grains in the digital image.

9. The method of claim 1, further comprising:
qualifying the contrast feature as a grain if the absolute value of the calculated intensity localization value is greater than a predetermined threshold intensity level; and
determining the ratio of the intensity of grains in the image to the total intensity of the digital image.

10. The method of claim 1, wherein at least one separately defined region of interest is in the image of the biological sample, wherein the calculating intensity localization values comprises calculating intensity localization values only for pixels located within the at least one separately defined region of interest.

11. The method of claim 1, wherein at least one separately defined region of interest is in the image of the biological sample, wherein the calculating intensity localization values comprises calculating intensity localization values only for pixels located within the at least one separately defined region of interest, wherein the at least one separately defined region of interest is defined by a cell interior.

12. The method in claim 1, wherein at least one separately defined region of interest is in the image of the biological sample, wherein the calculating intensity localization values comprises calculating intensity localization values only for pixels located within the at least one separately defined region of interest, wherein the digital image is only partitioned into search areas in the at least one separately defined region of interest.

13. The method in claim 1, wherein at least one separately defined region of interest is in the image of the biological sample, wherein the calculating intensity localization values comprises calculating intensity localization values for pixels located within at least one separately defined region of interest, and qualifying contrast features as grains if the absolute value of the calculated intensity localization value is greater than a predetermined threshold intensity level.

14. The method in claim 1, wherein the calculating intensity localization values comprises:
calculating intensity localization values for pixels located within at least one separately defined region of interest;
qualifying contrast features as grains if the absolute value of the calculated intensity localization value is greater than a predetermined threshold intensity level; and
determining the total number of grains in the at least one separately defined region of interest.

15. The method in claim 1, wherein the calculating intensity localization values comprises:
calculating intensity localization values for pixels located within at least one separately defined region of interest;
qualifying contrast features as grains if the absolute value of the calculated intensity localization value is greater than a predetermined threshold intensity level; and
determining the average number of grains in the at least one separately defined region of interest.

16. The method in claim 1, wherein the calculating intensity localization values comprises:
calculating intensity localization values for pixels located within at least one separately defined region of interest;
qualifying contrast features as grains if the absolute value of the calculated intensity localization value is greater than a predetermined threshold intensity level; and
determining the area of at least one grain in the at least one separately defined region of interest.

17. The method in claim 1, wherein the calculating intensity localization values comprises:
calculating intensity localization values for pixels located within at least one separately defined region of interest;
qualifying contrast features as grains if the absolute value of the calculated intensity localization value is greater than a predetermined threshold intensity level; and
determining the number of grains per unit area in the at least one separately defined region of interest.

18. The method of claim 1, wherein the calculating intensity localization values comprises:
calculating intensity localization values for pixels located within at least one separately defined region of interest;
qualifying contrast features as grains if the absolute value of the calculated intensity localization value is greater than a predetermined threshold intensity level; and
determining the average intensity localization value of grains in the at least one separately defined region of interest.

19. The method of claim 1, wherein the calculating intensity localization values comprises:
calculating intensity localization values for pixels located within at least one separately defined region of interest;
qualifying contrast features as grains if the absolute value of the calculated intensity localization value is greater than a predetermined threshold intensity level; and determining the intensity of grains in the at least one separately defined region of interest.

20. The method of claim 1, wherein calculating intensity localization values comprises:

calculating intensity localization values for pixels located within at least one separately defined region of interest;

qualifying contrast features as grains if the absolute value of the calculated intensity localization value is greater than a predetermined threshold intensity level; and determining the ratio of the intensity of grains in the at least one separately defined region of interest to the total intensity of the at least one separately defined region of interest.

21. The method of claim 1, wherein the target contrast features analyzed in the digital image depict receptor internalization.

22. The method of claim 1, wherein the target contrast features analyzed in the digital image depict nuclear chromatin.

23. The method of claim 1, wherein the target contrast features analyzed in the digital image depict vesicular structures.

24. The method of claim 1, wherein the target contrast features analyzed in the digital image depict labeled cellular organelles.

25. The method of claim 1, wherein the target contrast features analyzed in the digital image depict labels or probes that localize to a specific tissue region and that produce a punctate image pattern indicative of the specific tissue region.

26. The method of claim 1, wherein the target contrast features analyzed in the digital image depict labels or probes that localize to a subcellular region and that produce a punctate image pattern indicative of labeling the subcellular region.

27. The method of claim 1, wherein the intensity localization value is calculated by dividing the pixel intensity of the interior pixels within the test region by the pixel intensity of the perimeter pixels located at the perimeter of the test region.

28. The method of claim 1, wherein the intensity localization value is calculated by the difference between the pixel intensity of the interior pixels within the test region and the pixel intensity of the perimeter pixels located at the perimeter of the test region.

29. The method of claim 1, further comprising calculating an average image background intensity level and subtracting the average image background intensity level from the pixel intensity of the interior pixels within the test region prior to division by the pixel intensity of the perimeter pixels located at the perimeter of the test region.

30. An automated system for analyzing target contrast features in a digital image of a biological sample, comprising:

an image acquisition system adapted to acquire the digital image of the biological sample; and a processor adapted to partition at least a portion of the digital image into search areas of similar size with the target contrast features, locate a first pixel within each of the search areas based on pixel intensity level, locate a test region around each of the first pixels, wherein the test regions and the target contrast features are similar in size, and calculate intensity localization values for the test regions by comparing, for each test region, the intensity level of a plurality of interior pixels located within the test region to the intensity level of a plurality of perimeter pixels located at the perimeter of the test region.

* * * * *